United States Patent [19]

Ratti

[11] Patent Number: 5,432,825
[45] Date of Patent: Jul. 11, 1995

[54] ENABLING CODE FOR RADIOTRANSMISSION OF DATA

[75] Inventor: Umberto Ratti, Turin, Italy

[73] Assignee: Sixtel, S.p.A. Corp., Turin, Italy

[21] Appl. No.: 924,041

[22] PCT Filed: Dec. 24, 1991

[86] PCT No.: PCT/EP91/02520
§ 371 Date: Nov. 9, 1992
§ 102(e) Date: Nov. 9, 1992

[87] PCT Pub. No.: WO92/12585
PCT Pub. Date: Jul. 23, 1992

[30] Foreign Application Priority Data

Jan. 11, 1991 [IT] Italy .................... 00010/91

[51] Int. Cl.$^6$ .............................................. H04L 7/00
[52] U.S. Cl. .................................. 375/365; 375/368; 375/340
[58] Field of Search ............... 375/114, 116, 94, 95, 375/118, 1, 119; 370/105.4, 105.5, 106

[56] References Cited

U.S. PATENT DOCUMENTS 4,847,877  7/1989  Besseyre ........................ 375/114

FOREIGN PATENT DOCUMENTS 2004164  3/1979  United Kingdom .

OTHER PUBLICATIONS

N. R. Sollenberger et al., *Architecture and Implementation of an Efficient and Robust TDMA Frame Structure for Digital Portable Communications*, 39th IEEE Vehicular Tech. Conf. (May 1, 1989, San Francisco, Calif.) vol. 1, at 169–74.

M. W. Willard, *Optimum Code Patterns for PCM Synchronization*, Proceedings of the Nat'l Telemetering Conf. (May 23–25, 1962, Washington, D.C.), at 5.5.1–5.5.11.

P. F. Driessen, *Binary Frame Synchronisation Sequences for Packet Radio*, Elec. Lett., vol. 23, No. 22 (Oct. 22, 1987) at 1190–91.

T. Schaub, *Improved Binary Frame Synchronization Scheme for Packet Transmission*, Elec. Lett., vol. 24, No. 6 (Mar. 17, 1988) at 301–02.

*Primary Examiner*—Stephen Chin
*Assistant Examiner*—Tesfaldet Bocure
*Attorney, Agent, or Firm*—Banner & Allegretti, Ltd.

[57] ABSTRACT

A radiotransmission station transmits digital data at a predetermined rate to a receiving station. The receiving station is controlled by a timing circuit which recognizes a predetermined enabling code. The digital data is transmitted as bit sequences and each sequence contains a first group of bits for synchronizing the timing circuit and the transmission rate. This first group of bits is followed by a second group of bits which includes the enabling code. The recognition of the enabling code enables the reviewing station to receive and process the transmitted information. The enabling code is derived from a sequence of logical "1" and "0" bits and certain bits of the sequence are altered to form groups of three like bits (111,000). Each group of three bits has no more than two adjacent pairs of like and opposite bits (00,11). The group of like bits are arranged in a first part of the second group so that the chances of incorrect recognition are minimized and the synchronization achieved by the first group is unaltered.

15 Claims, 4 Drawing Sheets

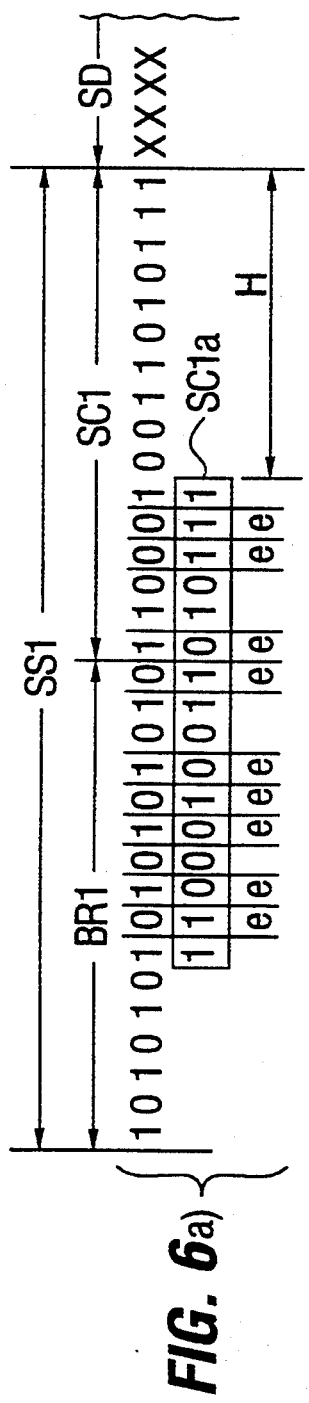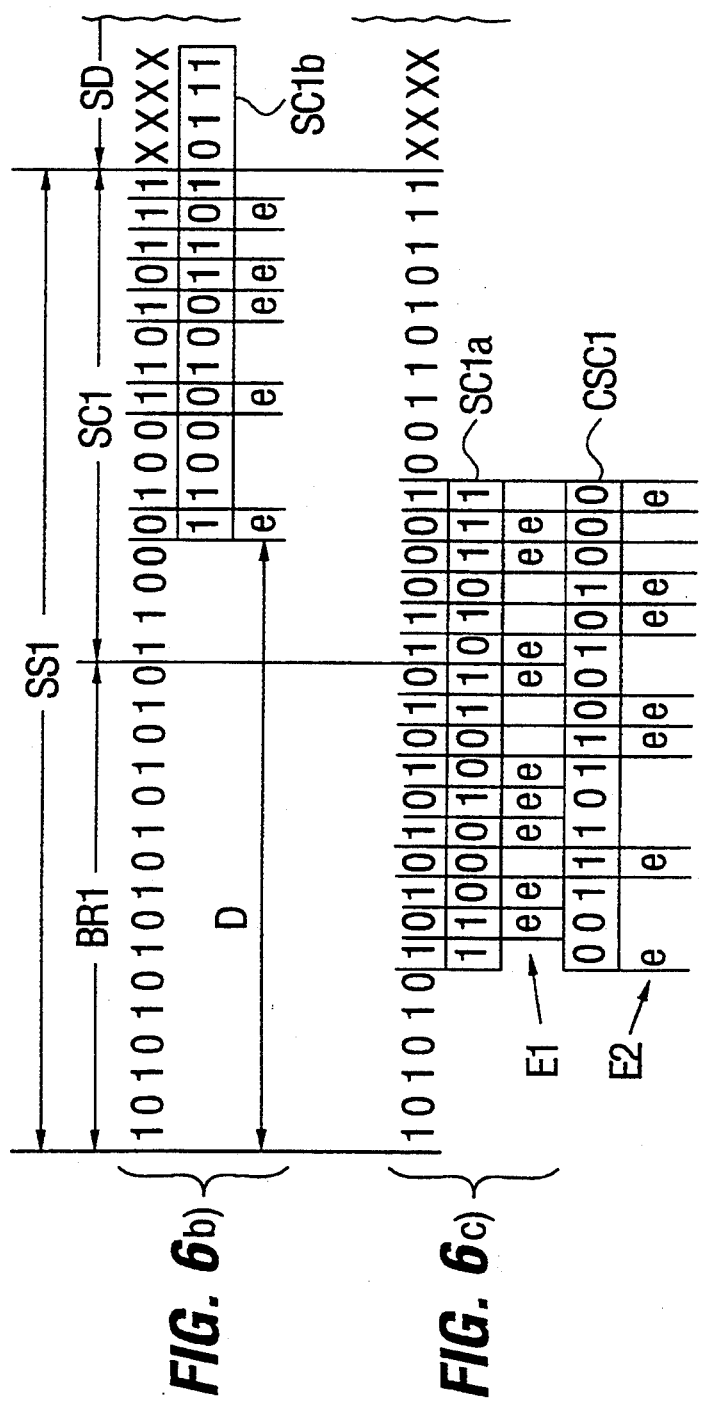
FIG. 6a)
FIG. 6b)
FIG. 6c)

ENABLING CODE FOR RADIOTRANSMISSION OF DATA

BACKGROUND OF THE INVENTION

This invention relates to apparatus for the radiotransmission of data between a radiotransmitting station and a radioreceiving station and more specifically, to the recognition of enabling codes capable of enabling the receiving station to recognise and to process transmitted data encoded according to a predetermined key.

It is known for radioreceivers to be provided with devices which recognise enabling codes to enable the radioreceiver to receive data transmitted through air. Generally, the enabling code is a sequence of bits, and follows a group of bits used to synchronise the receiver to the transmission frequency. In some cases, as a result of radio frequency disturbances or of interferences with other transmissions, these enabling codes are erroneously interpreted by the recognising device as other synchronisation signals, but out of phase with the true transmitted synchronisation signals transmitted. The result is that the radioreceiver is not longer capable of recognising and processing the data transmitted.

SUMMARY OF THE INVENTION

The present invention aims to overcome the problem outlined above and to provide apparatus which has an enabling code recognition device which, in association with a particular code or key structure, is very rugged, and has a low susceptibility to incorrectly recognising codes, and also has the ability to improve the synchronisation of the radioreceiver with the data transmission frequency.

According to the invention, there is provided for the radiotransmission of data as defined in claim 1.

BRIEF DESCRIPTION OF THE DRAWINGS

An embodiment of the invention will now be defined, by way of example, and with reference to the accompanying drawings, in which:

FIG. 6 is a representative in binary form of information processed by the apparatus of FIG. 4;

FIG. 8b shows the harmonic content of the signal of FIG. 8a.

DETAILED DESCRIPTION

The apparatus for radiotransmission of data is designed to transmit data in digital form at radio frequencies between two or more personal computers which are located in the same building or in separate buildings within a radius of no greater than approximately 500 m.

Figure 1:
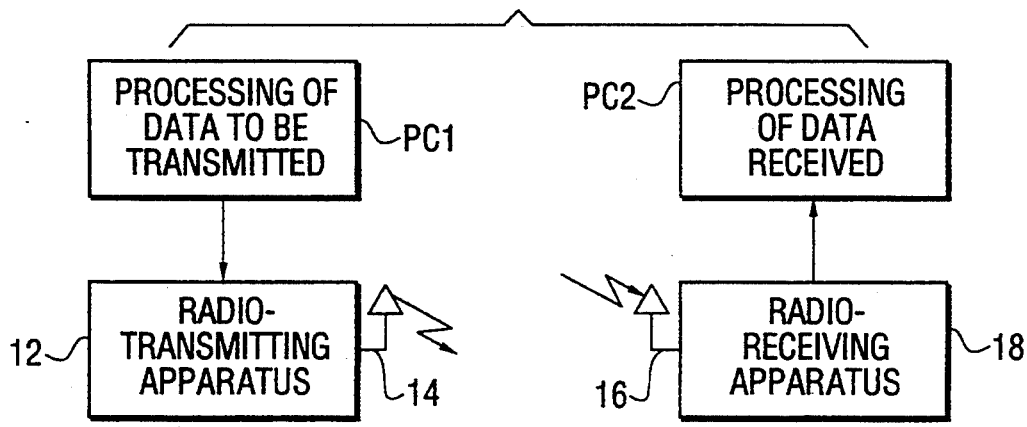
FIG. 1 is a block diagram showing, in outline, the general structure of an embodiment of the invention.
Figure 2:
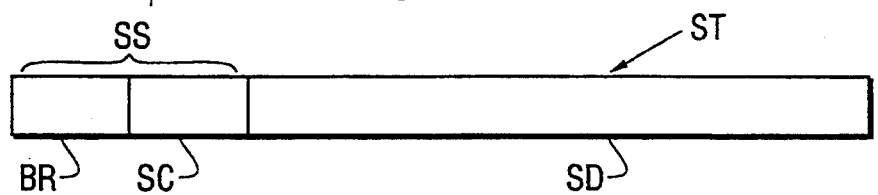
FIG. 2 shows a complete bit string containing the information transmitted by the apparatus of claim 1.

FIG. 1 shows a typical configuration of the above mentioned apparatus for transmission, in which a first system for processing data, for example a personal computer PC1, processes in known manner data to be transmitted in digital form to a second system for processing data, for example a personal computer PC2. PC1 is equipped with a digital radiotransmitting apparatus 12 of known type, which is capable of transmitting the data processed by PC1 by means of a transmitting antenna 14. The electromagnetic signals transmitted are picked up by a receiving antenna 16 which is connected to a radio receiving apparatus 18 which is incorporated in the form of an additional card or module in the personal computer PC2. The signals transmitted by the radiotransmitting apparatus 12 are organised in the form of successive blocks or strings ST of bits (FIG. 2). Each string ST is made up in total of 480 bits, the first 32 bits of which constitute the so-called synchronisation sequence SS, while the following group of bits SD represents the set of data transmitted. Each string ST is followed by a group of 64 non-significant bits, not shown in FIG. 2, which are used to separate the strings ST from one another.

The synchronisation sequence SS is in turn subdivided into a first group BR of 16 bits known as a bit reverse sequence and it is used, as will be seen below, to sychronise the radioreceiving apparatus. A second group SC of 16 bits is used to recognise the end of the period of synchronisation and the start of reception of the data.

The first group BR is made up of an ordered sequence of logic "1"s and "0"s represented by the hexadecimal number "AAAA", equivalent to the binary form 1010101010101010.

The second group SC of bits of recognition key, is made up, or a set of variously grouped "1" and "0" bits, represented for example by the hexadecimal number BA8C, equivalent to the binary form 1011101010001100. Similarly, the sequence SD of data situated following the key is made up of a series of variously grouped bits.

Figures 3A, 3B, 3C:
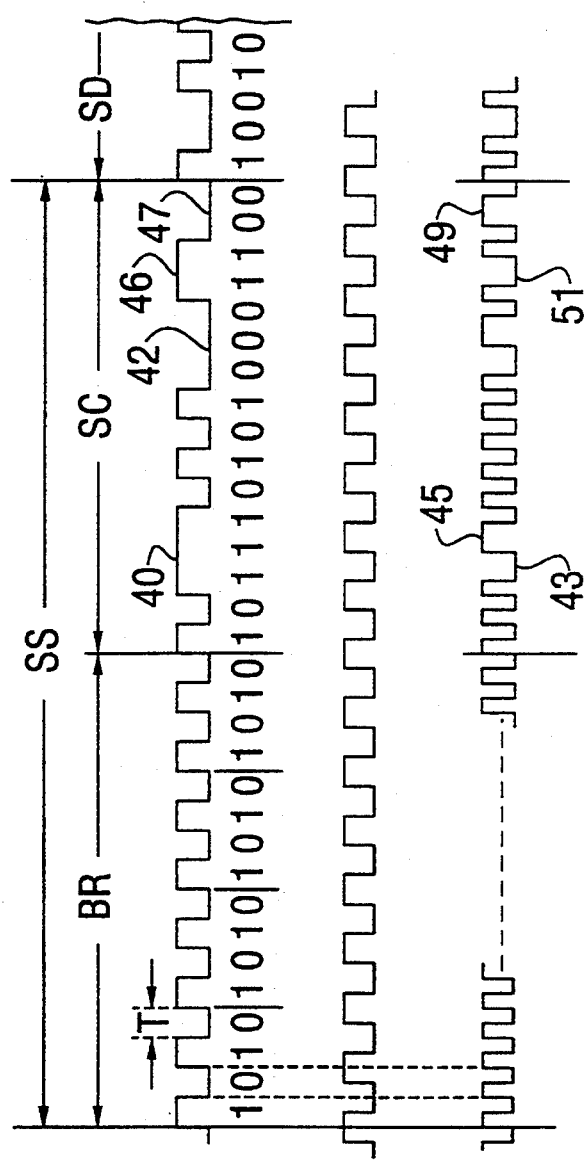
FIG. 3 shows wave forms of digital signals processed by the apparatus of FIG. 1.

FIG. 3a represents the form of the electric signal corresponding to the groups BR, SC and SD of the string ST transmitted by the antenna 14 in the form of positive and negative pulses, each of a duration T ($\mu$sec.). It is clear that the group BR forms a series of eight complete square waves, the harmonic analysis of which, as is known, reveals a superimposition of one wave of fundamental frequency $f0 = \frac{1}{2} T$ and of waves having odd harmonic frequencies $f1 = 3/2\ T$ $f2 = 5/2T$ etc.

The fundamental frequency $f0$ is selected for example as 576 kHz as this frequency is correctly used for the transmission of data, for which duration T of a pulse is 0.868 $\mu$sec.

The repetition frequency or transmission rate of the bits of the strings ST is: $ft = 1/T = 1.152$ megabit/sec.

Figure 4:
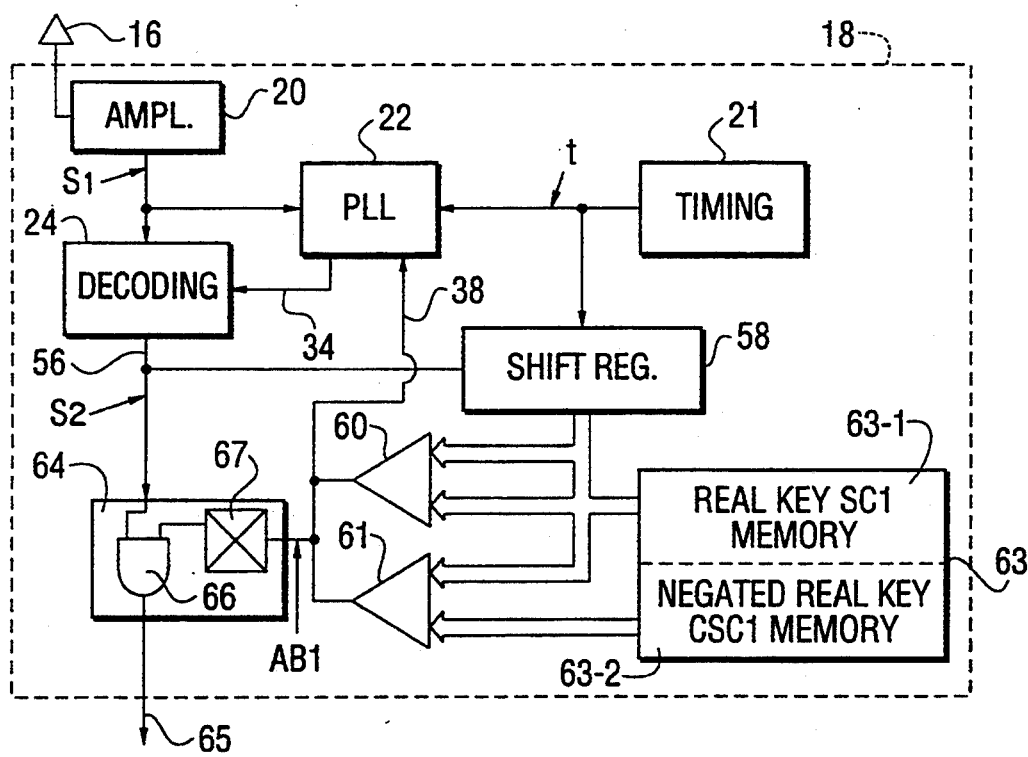
FIG. 4 shows a functional logic diagram of a portion of the structure in FIG. 1.

The radioreceiving apparatus 18 (FIG. 4) comprises an input stage 20 which expediently amplifies the signal S1 picked up by the antenna 16. The stage 20 sends the signal to a synchronisation circuit 22 and to a decoding circuit 24. The circuit 22 carries out the function of synchronising the characteristic timing of the receiving apparatus 18 with the transmission rate I/T of the signals sent by the transmitting apparatus 12.

Since the transmission is in digital form, the above-mentioned synchronisation consists in locking the phase $\phi t$ of the timing signal Ft generated by a timing circuit 21 of a known type of the radioreceiver 18 with the phase φ1 of the signals transmitted by the transmitter 12. To this end, use is expediently made of a phase-locking oscillator circuit 22, known in the art by the abbreviation PPL and distributed commercially under the abbreviation SN74LS297 by Texas Instruments.

The functioning of the circuit 22 (FIG. 4) is known to the expert in the field and will therefore only be described in brief below.

For further information on the circuit 22, refer to the article by W. T. Greer and B. Kean in Electronic Design of 31st Mar. 1982.

Figure 5:
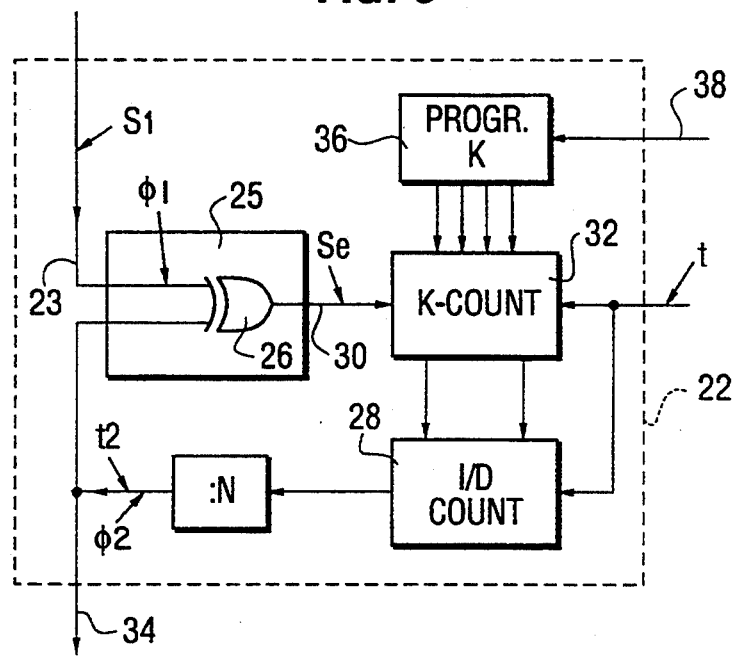
FIG. 5 shows a simplified block diagram of a phase locking circuit of the apparatus of FIG. 1.

The signal received, S1 (FIGS. 4, 5), which has a characteristic phase φ1 and is expendiently amplified by the circuit 20, is applied to an input 23 (FIG. 5) of a phase comparator 25 containing an XOR gate 26. The comparator 25 compares the phase φ1 with the phase φ2 of the timing signal t2 derived in known manner from the signal t by means of an up/down-counter 28 and by a divider 29. The error signal Se present at the output 30 of the comparator 25 is represented in FIG. 3c and, in the absence of error, has a duty cycle of 50% in relation to each bit of the input signal S1.

In the presence of positive or negative phase error, the signal Se has "0" bits or "1" bits respectively of longer duration in order to operate an up/down-counter 32 which operates between two predetermined limits +K and −K so as to keep exactly in phase with one another or locked the input signal S1 and the signal t2. In other words, the counter 32 counts up during the period in which the signal Se (FIG. 3c) is at "1" and counts down during the period in which the signal Se is at "0".

Therefore, when the signal Se rests at "1" or at "0" for a time equal to or longer than +K or −K respectively, the counter 32 is reset and the synchronisation of S1 with t2 is lost. When locking has taken place, the signal t2 at the output 34 of the circuit 22 is made up (FIG. 3c) of an ordered sequence of "1" and "0" bits, each having a duration T/2, and, in other words, the signal t2 is balanced perfectly.

Therefore, when the receiving apparatus receives the sequence BR, it synchronises with the transmission rate of the signal S1. When, after the sequence BR, the sequence SC is received, it can be seen from the diagrams in FIG. 3a, b, c that groups of 3 like bits, such as for example 40, 42, generate two adjacent like pulses 43 and 45 of opposite sign and of duration T. The fact that the pulses 43 and 45 are adjacent has the effect that the counter 32 does not reach the limits +K or −K, as a result of which the synchronisation previously brought about by means of the sequence BR is not altered.

However, groups of two like bits always generate two consecutive like pulses. If the groups of two like bits are in like and opposite pairs such as 46 and 47, two pairs of pulses 49, 51 of opposite value are generated, but separated by two other single pulses, as a result of which, in this case, the counter 32 is operated for a longer time, with a greater risk of reaching the limits +K or −K. In this case the synchronisation can be altered. The circuit moreover comprises a programming circuit 36 which is connected to the counter 32 and capable of modifying the value of K in response to a signal AB1 present at one of its inputs 38, as will be explained below.

At the end of the examination of the bits of the sequence SC, the synchronisation is locked in the manner described below, as a result of which the data represented by the following sequence SD (FIG. 2) can be processed correctly.

Figure 7:
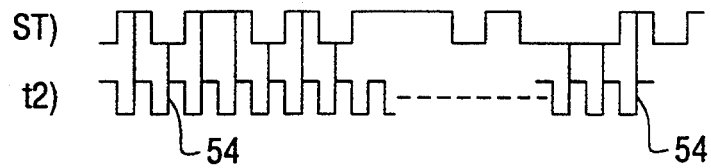
FIG. 7 shows an example of the sampling performed by the apparatus of FIG. 4.

With reference again to FIG. 4, the signal S1 is also sent to a sampling circuit 24 which, under the control of the signal t2 emitted by the circuit. 22, recognises the "1" or "0" level of the bits of the string ST at the rising edges 54 (FIG. 7) of the signal t2. At the ouput 56 of the sampling circuit 24, there is a signal S2 made up of the same bits of the string ST received, with a wave form which is perfectly digital, that is to say completely devoid of any disturbance or imperfection of the wave form, and thus in a condition to be correctly processed by the following stages of the receiving apparatus 18.

The signal S2 is then sent to a 16-cell shift register 58 which has a loading cycle of one bit at a time. Upon each cycle, the content of the register 58 is compared simultaneously in two comparators 60 and 61 with a real enabling key SC1 and respectively with its negation CSC1, both extracted from two sections 63-1, 63-2 of a memory 63 of known type which is connected to both the comparators 60 and 61. The positive outcome of the comparison effected by the comparators 60 and 61 means that the key represented by the sequence SC1 is the real one and is therefore recognised by the receiving appratus 18. In such a situation, the comparators 60 and 61 generate an approval signal AB1 in order to operate an enabling circuit 64 which makes it possible to send from one output 65 the data SD of the string ST to the personal computer PC2. If, on the other hand, as a result of disturbances of various types, some bits of the real code SC SC1 transmitted by the apparatus 12 are altered, the comparators will not recognises it and the circuit 64 will not authorise the output of the data bits as a result of which these are lost.

The enabling circuit 64 comprises an AND gate 66 for output of the data, controlled by a flip-flop 67, which, in the presence of the signal AB1, keeps the AND gate 66 active for the transfer of the data SD to PC2.

The signal AB1 is simultaneously sent, as already mentioned above, to the cirucit 36 which programs a value K', −K'. In this manner, the intervention of the phase corrector PLL is practically excluded, as a result of which the data bits of the sequence SD (FIG. 2), however they may be ordered, do not alter the synchronisation of the receiving apparatus 18 already achieved by means of the sequence BR and maintained during the reception of the sequence SC.

As is known in the art of radiotransmission, any recognition key such as the key SC1 shown in FIG. 6 must have two important perogatives: one is that of not causing the loss of the data transmitted, the other is the capacity of not altering the synchronisation of the receiving apparatus, brought about by means of the sequence BR1. It is to be noted that the key SC1, shown in FIGS. 6a–6c, differs from and is not related to the key SC shown in FIG. 3a. The key SC1 has been arbitrarily selected among possible keys obtainable from 16 bits, for the purpose of discussing the aforementioned prerogatives.

The first perogative is called the "robustness" of the recognition key. This indicates the degree of insusceptibility to incorrect recognition. The robustness is represented by the probabilites that the real key will be erroneously recognised in incorrect positions within the extent of the sequences SS1, both during the bit to bit comparison between the real key and the sequence SS1 and during the bit to bit comparison between the negation CSC1 of the key and the same sequence SS1.

Causes which can give rise to false recognition are generally noise and/or interference which can alter the content of the string ST.

A genuinely robust key is unlikely to suffer such effects.

In studying the robustness of a key, it is appropriate to separate two cases of false recognitions: anticipated recognition and delayed recognition. Anticipated recognition takes place when the real key SC1, referred to as SC1a in FIG. 6a, is compared with an equivalent group of bits straddling the sequence BR1 and the same key SC1 within the extent of the sequence SS as is shown by way of example in FIG. 6a. In the relative position of SC1, there is anticipated incorrect recognition if a number of bits, for example nine bits in the positions indicated by "e" of the key received are simultaneously erroneously inverted because of the above-mentioned disturbances.

Therefore the probability Pa that such an event will take place for each position of comparison is given by:

$$Pa = BER \cdot (1 - BER)^{16-H} \quad 1)$$

where BER is the rate of error conventionally admitted for the bits of the string ST, H is the displacement to the left of the key SC1a in relation to the key SC1 (FIG. 6a).

Delayed recognition takes place when the same real key SC1 of FIG. 6a and called SC1b in FIG. 6b is compared with an equivalent group of bits of the sequence SS1 straddling the group SC1 of bits and the following series of data SD, as is shown by an example in FIG. 6b. In such a relative position of SC1b, delayed incorrect recognition takes places if a number of bits, for example five bits of the key received in the positions indicated by "e" are simultaneously erroneously inverted by transmission disturbances. Therefore the probability Pr that such an event will take place for each position of the comparison is given by:

$$Pr = [BER^H \cdot (1 - BER)^{32-H-D}]/2^{D-16} \quad (D = 17 \ldots 31) \quad 2)$$

where D is the displacement to the right of the key SC1b in relation to the sequence BR1 and where the denomintor indicates the probability that the first D-16 bits of the series of data SD are the same as the correponding bits of the key SC.

Considering the comparison of the sequence SS1 with the negation of the key CSC1, two similar expressions Pac and Prc not shown of the probabilities of incorrect recognitions of CSC1 are obtained.

In conclusion, a total probability coefficient of incorrect recognitions of the real key and its negation is defined:

$$Pt = \sum_{D=0}^{15} Pa + \sum_{D=17}^{31} Pr \quad 3)$$

$$Ptc = \sum_{D=0}^{16} Pac + \sum_{D=17}^{31} Prc \quad 4)$$

Lower values of Pt and Ptc indicate greater robustness.

Calculation of Pt and Ptc for all the combinations of the 16 bits of the sequence SC has made it possible to pinpoint a certain number of such combinations which have the minimum value of the probabilities of incorrect recognitions. In order to pinpoint among these combinations or keys that key which "functions" best, it is necessary to specify certain further conditions.

As has already been pointed out, each sequence of three like bits generates (FIG. 3) a pair of adjacent error signals of opposite sign, thus very well balanced. Therefore such a sequence can be obtained wihtout limits in the optimum key.

It has moreover been established that each sequence of two like bits generates a single error signal which has to be balanced by another sequence of two like and opposite bits arranged immediately afterwards: since, then, sequences of two like and opposite bits generate error signals which are more spaced out, that is to say less balanced than those generated by a single sequence of three bits, it is concluded that it would be better to exclude them; however, it has been noted that the best combinations, that is to say those with the minimum value of probability Pt and Ptc of incorrect recognitions, comprise at least one sequence of two bits. Therefore the optimum key can contain one sequence of two like and opposite bits.

Examining FIG. 6c, in which the sequences BR1 and SC1 of FIG. 6a are repeated and in which the negation CSC1 of the key SC1 is added, it can be seen that the E2 discordance number in relation to the negation CSC1 is the complement on 16 of the E1 discordances in relation to SC1. Since the higher the number of discordances is, the lower the probability of incorrect recognition is, in the calculation of the total probabilities resulting from the comparison of the real key SC1 and of the negation CSC1, is is clear that there is a lower total probability of incorrect recognitions when the discordances E1 and E2 tend to be equal.

Therefore a further condition arises, that the optimum key must have a number of discordances tending to its complement on 16 in all the comparisons between the same key and its negation in relation to the sequence SS1 in the subsequent relative positions.

By examining the numerous combinations which can be obtained using 16 bits in a sequence for a recognition key, it has been found that the best combination, which satisfies the preceding conditions is that made up of a sequence of "1" and "0" bits comprising one or more groups of three like bits, alternating or associated with not more than two adjacent pairs of like and opposite bits, preferably arranged in the first part of the sequence. This key is represented by the hexadecimal number E98A, corresponding to the binary form 1110100110001010.

The key chosen must moreover start with a bit of opposite sign to the last bit of the timing sequence BR which precedes the sequence SC.

Figure 8A:
FIG. 8a shows a signal corresponding to the sequence of an optimised recognition key.

The key chosen as optimum and indicated above has a corresponding electric wave form, shown in FIG. 8a.

Harmonic analysis of the wave form in FIG. 8a reveals that each sequence of two like bits generates frequency peaks at a fundamental frequency $f'_0 = \frac{1}{4} T$ and at its odd harmonics: $f''_1 = 3/6 T$, $f''_2 = 5/6 T$ etc.

Figure 8B:
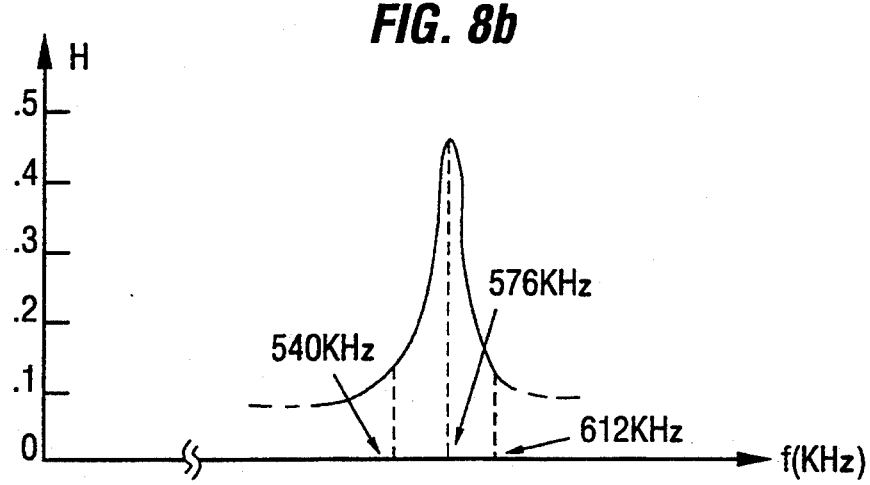

From the diagram of the harmonic content of the wave form of the key in FIG. 8a, shown in FIG. 8b, a clear and isolated peak emerges at the fundamental frequency of $= \frac{1}{2} T = 576$ kHz, equal to the frequency of synchronisation of the receiving apparatus 18.

Therefore it can be seen that the sequence of two bits of the key FIG. 8a does not make any contribution to the fundamental frequency of 576 kHz, having frequency peaks at a great distance from it, which the sequence of three bits makes a certain contribution with its second odd harmonic 3/6 T=½ T=576 kHz to the synchronisation frequency.

Therefore it has been verified that the key chosen and indicated above not only does not interfere with the synchronisation of the apparatus 18 but makes a contribution to keeping it locked to the signal received. This is also brought about by virtue of the balanced content of "1" and "0" bits, that is to say of eight "1" bits and eight "0" bits.

It is to be understood that variations, additions and substitution of various integers described may be made without departing from the scope of the invention.

For example, the radiotransmitting apparatus 12 and the radioreceiving apparatus 18 can be respectively integrated in two separate portable telephone apparatus, each connected to the corresponding personal computer and adapted to transmit and respectively to receive via radio on telephone channels the data processed by the corresponding personal computer.

I claim:

1. Enabling code for an apparatus for radiotransmission of data, comprising a radiotransmitting station capable of transmitting digital information at a predetermined rate to a receiving station, the receiving station comprising a recognising circuit including a synchronisation phase-locking circuit controlled by a timing circuit for recognising a predetermined enabling code, the digital information being transmitted as bit sequences, each sequence comprising at least a first group of synchronisation bits for synchronising said recognising circuit with the data transmission rate, and a second group of bits including the enabling code, immediately following the first bit group, the enabling code comprising sixteen bits, at least eight of which are of a value of logical "1", said recognising circuit being responsive to the recognition of the code for enabling the receiving station to receive and process the transmitted information, wherein the enabling code comprises a sequence of logical "1" and logical "0" bits, ordered in the sequence to form groups of three like bits (111;000), an initial bit of the enabling code having a value opposite to a value of a last bit of the first bit group, at least two groups of said three like bits being separated by no more than two adjacent pairs of like and opposite bits (00;11), said adjacent pairs of bits being substantially arranged in a first half of the second bit group, wherein the enabling code comprises a plurality of synchronization bits, whereby said recognising circuit is enabled to recognize the code with a minimum probability of incorrect recognition and to maintain unaltered the synchronisation achieved by the first group of bits.

2. Enabling code according to claim 1, wherein the last group of three like bits are immediately followed by at least two pair of said synchronisation bits of the first bit group.

3. Enabling code according to claim 2, wherein the enabling code is represented by hexadecimal number E98A.

4. Enabling code according to claim 3, wherein the enabling code has the minimum probability of incorrect recognition of all possible bit combinations in the second group of bits.

5. Enabling code according to claim 3, wherein the code is represented by a digital signal having a harmonic content of frequencies, said digital signal having a single pick of said harmonic content located exclusively at a frequency corresponding to said transmission rate.

6. Enabling code according to claim 5, wherein said corresponding frequency is the fundamental frequency of said digital signal.

7. Enabling code according to claim 1, wherein the code is represented by a digital signal having a harmonic content of frequencies, said digital signal having a single pick of said harmonic content located exclusively at a frequency corresponding to said transmission rate.

8. Enabling code according to claim 7, wherein said corresponding frequency is the fundamental frequency of said digital signal.

9. Enabling code according to claim 1, wherein the radiotransmitting station comprises a radiotransmitting apparatus integrated into a first data processing system including a first personal computer, and the receiving station comprises a receiving apparatus integrated in a second data processing system including a second personal computer different and separate from the corresponding first personal computer.

10. Enabling code according to claim 9, wherein the radiotransmitting apparatus and the receiving apparatus comprise portable telephone apparatus connected respectively to the first data processing system and the second data processing system and capable respectively of transmitting and receiving said data at radio frequencies on prearranged telephone channels.

11. In a radiotransmission apparatus using an enable code according to claim 1, wherein said recognising circuit comprises a comparator to generate an error signal responsive to a comparison of successive portions of the transmitted digital information with the enabling code, an up/down counter set at predetermined limits +K −K by a limit programming circuit, and an enabling circuit controlled by said counter to allow the transfer of said digital information when said counter does not reach said limits and to prevent the transfer of said digital information when said counter reaches said limits, wherein the limit programming circuit is caused by said error signal to change said predetermined limits, when said counter does not reach said limits.

12. Enabling code according to claim 1, wherein the enabling code is represented by hexadecimal number E98A.

13. Enabling code according to claim 12, wherein the enabling code has the minimum probability of incorrect recognition of all possible bit combinations in the second group of bits.

14. Enabling code according to claim 12, wherein the code is represented by a digital signal having a harmonic content of frequencies, said digital signal having a single pick of said harmonic content located exclusively at a frequency corresponding to said transmission rate.

15. Enabling code according to claim 14, wherein said corresponding frequency is the fundamental frequency of said digital signal.

* * * * *